United States Patent

[11] 3,615,911

[72] Inventors Ethan A. Nesbitt
 Berkeley Heights;
 Jack H. Scaff, Bernards Township,
 Somerset County, N.J.; Henry C. Theuerer,
 New York, N.Y.
[21] Appl. No. 825,261
[22] Filed May 16, 1969
[45] Patented Oct. 26, 1971
[73] Assignee Bell Telephone Laboratories Incorporated
 Murray Hill, N.J.

[54] SPUTTERED MAGNETIC FILMS
 5 Claims, 2 Drawing Figs.
[52] U.S. Cl. .................................................. 148/31.57,
 75/123, 75/125, 75/170, 148/101
[51] Int. Cl. ......................................................... C22c 19/00,
 H01f 1/04
[50] Field of Search........................................... 75/123,
 152, 170, 125; 148/31.55, 31.57, 101, 102, 103

[56] References Cited
 UNITED STATES PATENTS
2,813,789 11/1957 Glaser............................ 75/123
3,421,889 1/1969 Ostertag et al................. 75/170
3,424,578 1/1969 Strnat et al. ................... 75/170 UX
 FOREIGN PATENTS
6,608,335 12/1967 Netherlands................... 148/31.57
 OTHER REFERENCES
Nesbitt et al., New Permanent Magnet Materials, Applied Physics Letters, Vol. 12, No. 11, June 1, 1968, pages 361 and 362.

Primary Examiner—L. Dewayne Rutledge
Assistant Examiner—G. K. White
Attorneys—R. J. Guenther, Edwin C. Cave ABSTRACT: Sputtered films containing compositions exemplified by $Co_5Sm$ sometimes with nonmagnetic diluents such as Cu manifest magnetic properties similar to the best reported for the corresponding bulk compositions. Coercivities for the best films are generally superior to the bulk coercivities and, in some instances, may be as high as tens of thousands of oersteds.

PATENTED OCT 26 1971 3,615,911

INVENTORS E.A. NESBITT
J.H. SCAFF
H.C. THEUERER

BY *George S. Indig*

ATTORNEY

SPUTTERED MAGNETIC FILMS

BACKGROUND OF THE INVENTION

1. Field of the Invention

The invention is concerned with permanent magnetic materials prepared in thin form by sputtering. Uses, based on high values of coercivity and energy product, are in magnetic indexing and miniaturized magnetic apparatus.

2. Description of the Prior Art

In Vol. 38, No. 3, Journal of Applied Physics, p. 1001 (Mar. 1967), magnetic properties for powders of compositions exemplified by $Co_5Sm$ are reported. Coercivities sometimes as high as thousands of oersteds are reported for particles of the order of 10 microns in largest dimension.

Attempts to produce bulk bodies of such compositions having the same magnetic properties were unavailing until development of the procedure reported in Vol. 12, Applied Physics Letters, p. 361 (1968). In accordance with that reference, modification of the cobalt-rare earth material by inclusion of a nonmagnetic diluent such as coppery resulted generally in the retention of the properties associated with fine particles. A possible explanation follows from the assumption that the bulk bodies are two-phase with magnetic regions effectively of dimensions approximating those of the earlier reported fine particles. Such dimensions are sufficiently small that substantial domain wall motion is inhibited.

SUMMARY OF THE INVENTION

Good magnetic properties are obtained in this films of rate earth-containing compositions of the nature described above by sputtering. Coercivities are generally comparable to those of the bulk bodies containing nonmagnetic diluent and, under optimum conditions, coercivity values may be higher.

The general retention of bulk properties in thin films produced in accordance with the invention is quite unusual. Films of other hard magnetic materials produced by various techniques, including sputtering, have, in general, not resulted in retention of bulk properties.

A particularly surprising aspect of the invention involves sputtered layers of undiluted materials, e.g., $Co_5Sm$, et cetera. Bulk bodies of such materials have, as noted, been disappointing in that the excellent hard magnetic properties associated with the particles were lost. Sputtered layers of such materials do, however, manifest the high coercivities associated with fine particles. While such coercivities are not quite as high as those of the best diluted sputtered layers, the absence of diluent may result in a higher energy product. Such layers, containing only rare earth and transition metal constituents, constitute a preferred embodiment in accordance with the invention.

DETAILED DESCRIPTION

1. Method of Deposition

Figure 1:
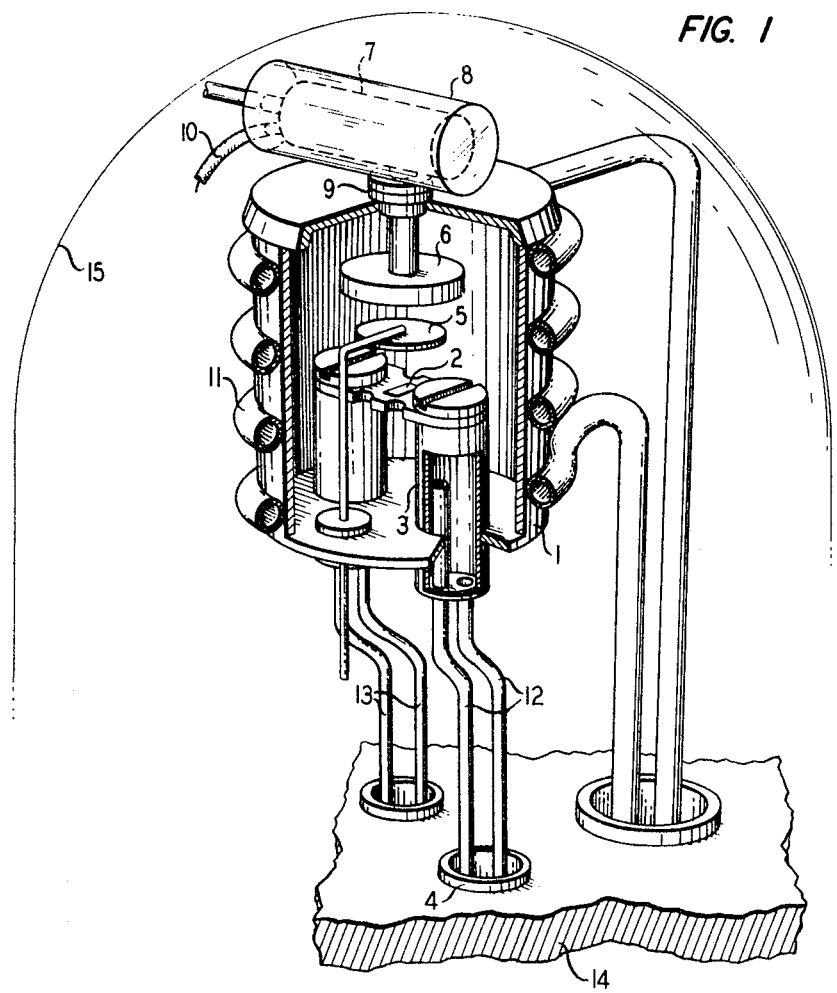
FIG. 1 is a perspective view, partly in section, of a sputtering apparatus suitable for preparation of films in accordance with the invention.

A special problem in the deposition of rare earth-containing materials is the reactivity of such constituent with atmospheric ingredients such as oxygen. While this problem may be avoided by use of conventional apparatus operating at extremely high vacuum, e.g. $10^{112}$ mm. of Hg, a more expedient approach is to utilize the getter-sputtering method and apparatus described in, for example, Vol. 35, Journal of Applied Physics, p. 554 (1964). This procedure, use of which with an initial vacuum of about $10^{16}$ mm. (before bleeding in the sputtering gas), results in the properties reported herein. A suitable getter-sputtering procedure is described in conjunction with FIG. 1.

The apparatus is made up of anode can 1 which may be constructed of stainless steel, substrate table 2, coolable electrode 3, liquid nitrogen feedthrough 4, substrate shutter 5, sputtering cathode 6, cathode holder 7, quartz shield 8, quartz bushing 9, power lead 10 connected to source not shown, and cooling coil 11. The entire apparatus is contained in an enclosure consisting of base 14 and bell jar 15.

Figure 2:
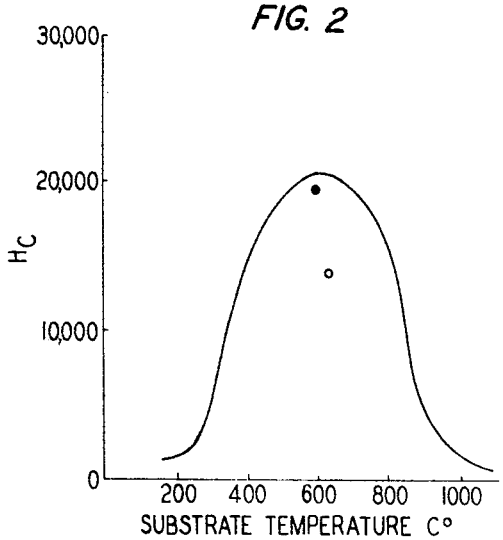
FIG. 2, on coordinates of coercivity in oersteds and substrate temperature in degrees C., is a plot showing the general form of the relationship between these two parameters for a sputtered layer of the invention.

The particular apparatus used in the preparation of the films for which properties are plotted in FIG. 2 utilized stainless steel can 1 of dimensions 2½-inch OD by 2¾-inch height. In use, the can may be cooled with liquid nitrogen which is circulated through copper coil 11. The can was fitted with insulated tubular anodes to which a tantalum substrate table 2 made of 0.005-inch sheet was attached. While the apparatus depicted is provided with cooling means, best films resulted when deposition was carried out on a heated substrate. Such heating was accomplished resistively by means of power leads 12 and 13 connected to source not shown.

The target of the desired alloy composition (sputtering cathode 6) was made from an argon-arc melted button 1 inch in diameter by one-fourth inch thick. The target was mounted by means of a ¼-inch diameter by 1½-inch cobalt rod which was connected to the negative terminal of a power source. The apparatus was contained in a bell jar having a height of 30 inches and an outside diameter of 18 inches.

A variety of substrate materials were used, and while satisfactory coatings resulted on all of them, best results were obtained with amorphous substrate materials (alternatives included mica and sapphire). For experimental reasons, a rigorous substrate-cleaning procedure was followed. This involved an ultrasonic wash. Washing in suitable solvents removes residual organic and inorganic contaminates from the substrate surface. The apparatus was first evacuated to a pressure of $10^{15}$ to $10^{16}$ mm. Deposition was carried out in a partial pressure or argon of about 70 microns ($7 \times 10^{12}$ mm.) using 1,500 volts DC which, under the experimental conditions, resulted in a sputtering current of 10 milliamperes.

With shutter 5 protecting the substrate, the target was then sputtered for a period of about 1 hour to coat the can walls with a gettering film of the sputtering material. Deposition rates were of the order of 130 A. per minute and A. thicknesses of from a few hundred angstroms to a few microns were prepared.

While alternative procedures are certainly available and may result in the film properties reported, it is desirable to operate with a homogeneous cathode target of the desired film composition. Variations such as sintered sources or multiple targets usually require more complex apparatus and do not generally result in uniform film composition.

2. Coercivity Values

Coercive force was measured by suspending the specimen in a 30 kg. field. The magnetized specimen was suspended with a silk fiber, the magnetic field was reduced and reversed, and the field was increased until the magnetization direction of the specimen was switched. It was found that coercivity values were dependent to some extent on the substrate temperature used during deposition.

FIG. 2 is an illustrative plot showing the dependent of coercivity on substrate temperature. The particular values plotted are those for undiluted stoichiometric $Co_5Sm$. While the particular values of coercivity are different for different compositions, the general relationship as well as the approximate optimum peak substrate temperature are applicable for the other compositions included herein. Film thickness was about 4,000 A. for the plotted data. Dependence of coercivity on film thickness is discussed further on.

From FIG. 2, it is seen that the optimum substrate temperature lies within the range from about 400° to about 800° C., and the peak coercivity value is somewhat above 20,000 oersteds (this compares with the values of about 1,000 oersteds for a bulk body of the same composition). Data is plotted for three different substrate materials as indicated. It is seen that best results were obtained by use of amorphous substrate materials, and it is assumed that the slightly inferior coercivities resulting from the use of crystalline substrates were due to the tendency toward epitaxial growth which resulted in some increase in grain size. Nevertheless, it is seen that acceptable coercivity values were obtained on all substrates.

Data similar to that plotted on FIG. 2 for a copper-diluted sample of the composition $Co_{3.65}Cu_{1.35}Sm$ included a maximum coercivity of about 30,000 oersteds which compares to the value of about 12,000 oersteds for the comparable bulk composition.

Coercivity values were also thickness dependent. While there was little significant fall-off in coercivity for extremely thin films (down to 0.005 microns), coercivities of films appreciably thicker than about 10,000 A. (1 micron) approach the value measured on the corresponding bulk samples. While a preferred thickness range of from about 50 A. to about 1 micron is accordingly indicated, bulk magnetic properties, at least of the diluted compositions, are easily sufficient for many purposes and, accordingly, growth of film thicknesses of many microns is contemplated for some purposes.

3. Composition

The unique inventive results are generally associated with the entire class of previously reported transition metal-rare earth magnetic materials. The more significant of these materials are generally discussed in terms of intermetallic compositions having the stoichiometry $M_5RE$. The "cation" position designated M is primarily or solely occupied by one or both of the elements cobalt and iron. Diluents which have been found suitable in bulk compositions and which are equally suitable for use in sputtered films are copper, nickel and aluminum. Useful properties may be obtained where dilution in the M site is up to 98 atom percent. As noted in sputtered films, unlike bulk bodies, dilution is not required.

Rate earths (RE) are samarium, cerium, gadolinium, praseodymium, lanthanum, yttrium, neodymium and holmium; and they may be used singly or in any combination. Highest coercivities in sputtered layers have been obtained with samarium, cerium and praseodymium in that order; and these rare earth elements are, therefore, preferred.

While the $M_5RE$ stoichiometry is preferred in sputtered films (as in bulk samples), useful magnetic properties have also been reported for the stoichiometry $M_{8.5}RE$; and, consequently, the magnetic contribution of the sputtered film may result from compositions containing up to this "cation" content.

The broad range of compositions may, therefore, be expressed as $M_{x-y}M'_yRE$ where $x$ is from about 5 to about 8.5 and $y$ is from 0 to the atomic fraction $0.98x$, M is one or both of the elements cobalt and iron, M' is one or more of the elements copper, nickel and aluminum, and RE is as above defined.

As noted, a preferred species of the invention corresponds with a $y$ value of 0 although, from the coercivity standpoint, best results are obtained with a $y$ value of from about $0.3x$ to about $0.8x$. As also indicated, the preferred value of $x$ is about 5.

Coercivity values in the sputtered films have been attributed largely to the fine grain size which results from sputtering under the conditions noted. Some possible substantiation for this is seen in the experimental fact that long-term annealing results in a decrease in coercivity (unfortunately, the high reactivity of the rare earth constituent casts some doubt on the conclusion to be reached on the basis of these finds even though every effort was made to exclude oxygen and other active ingredients from the annealing atmosphere). In any event, high coercivity is certainly attributed, at least in part, to fine grain size (presumably of the order of the film thickness which is, in turn, sufficiently small so as not to be capable of supporting domain walls). Impurities which may lodge within grain boundaries may be tolerated and may even be desirable. Such impurities may include excess amounts of any of the elements indicated in the stoichiometry and any other material which does not "poison" the functional composition.

4. Other Considerations

The relationship of coercivity and (1) composition, (2) film thickness, and (3) substrate temperature has been discussed. All films prepared have manifested an easy direction in the plane of the film generally of such magnitude as to suggest substantial alignment in the observed direction. The responsible mechanism has not been ascertained and electron diffraction studies have not been revealing due to a thin oxide layer on top of the magnetic film. As in the bulk samples, the sputtered layers are believed to be made up of crystallites of hexagonal morphology. The easy direction, due to crystalline anisotropy, accordingly lies along the c-direction. Growth under the described conditions is generally in the c-direction.

What is claimed is:

1. Magnetic composition consisting essentially of material which may be represented by the approximate formula $M_{x1y}M<⅔_yRE$ where M is at least one of the elements selected from the group consisting of cobalt and iron, M' is at least one of the elements selected from the group consisting of copper, nickel and aluminum, RE is at least one of the elements selected from the group consisting of samarium, cerium, gadolinium, praseodymium, lanthanum yttrium, neodymium and holmium, $x$ is from approximately 5 to approximately 8.5 and $y$ is from 0 to the atomic fraction $0.98x$, characterized in that the said composition is in the form of a sputtered film on a substrate, said film being of a thickness of from about 0.005 micron to about 1 micron, and in which the film was produced by sputtering on a substrate maintained at a temperature of from 200° to 800° C.

2. Composition of claim 1 in which RE is a samarium.

3. Composition of claim 1 in which the film thickness is from about 50 A. to about 1 micron.

4. Composition of claim 1 consisting essentially of $Co_5Sm$.

5. Composition of claim 1 in which M is Co, RE is Sm, $x$ is 5 and $y$ is from 1.5 to about 6.